United States Patent
Nurmi et al.

(10) Patent No.: US 11,350,647 B2
(45) Date of Patent: Jun. 7, 2022

(54) METHOD FOR MANUFACTURING AN ACIDIFIED PROTEIN PRODUCT FROM CASEIN AND A PRODUCT OBTAINED THEREBY

(71) Applicant: VALIO LTD, Helsinki (FI)

(72) Inventors: Niko Nurmi, Helsinki (FI); Päivi Myllärinen, Helsinki (FI)

(73) Assignee: VALIO LTD, Helsinki (FI)

( * ) Notice: Subject to any disclaimer, the term of this patent is extended or adjusted under 35 U.S.C. 154(b) by 851 days.

(21) Appl. No.: 15/771,578

(22) PCT Filed: Nov. 2, 2016

(86) PCT No.: PCT/FI2016/050771
§ 371 (c)(1),
(2) Date: Apr. 27, 2018

(87) PCT Pub. No.: WO2017/077189
PCT Pub. Date: May 11, 2017

(65) Prior Publication Data
US 2018/0303125 A1    Oct. 25, 2018

(30) Foreign Application Priority Data
Nov. 2, 2015   (FI) .................................... 20155791

(51) Int. Cl.
| | |
|---|---|
| A23C 19/045 | (2006.01) |
| A23J 3/34 | (2006.01) |
| A23C 19/032 | (2006.01) |
| A23C 20/00 | (2006.01) |
| A23J 3/10 | (2006.01) |
| A23J 1/20 | (2006.01) |

(52) U.S. Cl.
CPC ........... *A23J 3/344* (2013.01); *A23C 19/0328* (2013.01); *A23C 19/045* (2013.01); *A23C 20/00* (2013.01); *A23J 1/202* (2013.01); *A23J 3/10* (2013.01); *A23V 2002/00* (2013.01); *A23V 2300/28* (2013.01)

(58) Field of Classification Search
CPC ....................................................... A23J 3/344
See application file for complete search history.

(56) References Cited

U.S. PATENT DOCUMENTS

| | | | |
|---|---|---|---|
| 3,406,076 | A | 10/1968 | Little |
| 5,445,845 | A | 8/1995 | Farkye et al. |
| 5,573,806 | A | 11/1996 | Farkye et al. |
| 2015/0181903 | A1 | 7/2015 | Uusi-Rauva et al. |

FOREIGN PATENT DOCUMENTS

| | | |
|---|---|---|
| EP | 1254601 | 11/2002 |
| EP | 1 061 811 | 8/2004 |
| RU | 2006 106 924 | 9/2007 |
| RU | 2011 149 249 | 6/2013 |
| WO | 2010/128207 | 11/2010 |
| WO | 2014/001636 | 1/2014 |
| WO | 2015/150637 | 10/2015 |

OTHER PUBLICATIONS

Office Action issued in EP Appln. No. 16797958.2 dated Jun. 9, 2020.
Database GNPD [Online] Mintel; Oct. 23, 2015, "Fat Free Natural Soft Cottage Cheese" retrieved from www.gnpd.com Database accession No. 3495459.
Office Action issued in RU Appln. No. 2018120329/10(032037) dated Dec. 14, 2020 (w/ translation).
International Search Report for PCT/FI2016/050771, dated Dec. 21, 2016, 5 pages.
Written Opinion of the ISA for PCT/FI2016/050771, dated Dec. 21, 2016, 6 pages.
Search Report for FI20155791, dated Jun. 1, 2016, 2 pages.
Myllärinen et al., "Effect of transglutaminase on rheological properties and microstructure of chemically acidified sodium caseinate gels", International Dairy Journal, vol. 17, 2007, pp. 800-807.
Office Action issued in EP App No. 16 797 958.2 (dated Mar. 11, 2021).

*Primary Examiner* — Elizabeth Gwartney
(74) *Attorney, Agent, or Firm* — Robert P. Michal, Esq.; Carter, DeLuca & Farrell LLP

(57) ABSTRACT

The present invention relates to an acidified protein product. Particularly, the invention relates to acidified protein product which can be used as a cheese or a meat substitute that can be fried or grilled. The present invention relates also the processes for producing such acidified protein products.

9 Claims, No Drawings

METHOD FOR MANUFACTURING AN ACIDIFIED PROTEIN PRODUCT FROM CASEIN AND A PRODUCT OBTAINED THEREBY

This application is the U.S. national phase of International Application No. PCT/FI2016/050771 filed 2 Nov. 2016, which designated the U.S. and claims priority to FI Patent Application No. 20155791 filed 2 Nov. 2015, the entire contents of each of which are hereby incorporated by reference.

FIELD OF THE INVENTION

The present invention relates to an acidified protein product. Particularly, the invention relates to acidified protein product which can be used as a cheese or a meat substitute that can be fried or grilled. The present invention relates also the processes for producing such acidified protein products.

BACKGROUND OF THE INVENTION

There is currently a continuous need for meat substituting protein products in the market. Meat substitutes are food products that approximate the aesthetic qualities and/or chemical characteristics of certain types of meat. Meat substitutes include, i.a., various vegetarian products, such as soybean flour, soybean sausages, tofu, tempeh, quorn, or meatless-based alternatives, such as minced soy protein TSP (textured soy protein), or bean curd, etc. The meat substitute does not contain meat or any component of meat origin but can be used as meat, like fried.

Halloumi, queso blanco and mozzarella cheeses are traditional fresh cheeses made of milk by coagulating casein with rennet, citric acid or a combination of a starter and rennet, respectively.

Halloumi is semi-hard, unripened brined cheese prepared by a conventional cheese making process wherein milk raw material is standardized in respect of fat and protein contents, heat treated and bactofugated. The treated milk raw material is then coagulated with a rennet to a coagulum. The coagulum is cut to form a whey-curd mixture. The whey curd mixture is then scalded at a temperature of 30 to 55° C. under stirring for 20 to 40 minutes. Whey is drained from the curd mixture, the curd is cooled and moulded to solid cheese. The moulded solid cheese is cooked typically in whey, brine, water or a mixture of these at 90 to 92° C. for 30 to 60 minutes. After cooking, Halloumi is cooled (30° C.), dry salted and packed. Halloumi is a typical example of cheeses in the market which can be fried and grilled.

Queso blanco is a creamy, soft, and mild unaged white cheese. It is made by heating whole fresh milk to near-boiling, adding a food grade acids such as lactic acid or hydrochloride acid, stirring until curds form, then draining the curds.

Mozzarella is Pasta Filata type, semi-soft, "elastic" fresh cheese. In mozzarella manufacturing process, a cheese curd is made with a rennet and a mozzarella starter. Whey is separated from the cheese curd, the curd is pressed and, if necessary, cheddared until a suitable pH, typically about 5.2-5.6, is achieved. Cheese is then milled to small pieces, heated and kneaded in whey at about 70° C. to a smooth plastic mass. The mass is moulded and cooled to provide mozzarella. Mozzarella has a pH of 4.7-5.6. Mozzarella melts easily.

Cottage cheese is conventionally made from skimmed milk by coagulating casein by acidification together with the aid of rennet. Cheese is typically acidic (pH 4.4-4.9). In the preparation, milk raw material is preheated in a conventional manner and then coagulated with an acid. After coagulation, the coagulum is cutted to form a whey-curd mixture. The mixture is typically scalded at a temperature of 45 to 55° C. under stirring for 60 to 120 minutes. Whey is separated from the curd mixture. The curd is cooled, washed, standardized (fat, salt) with a dressing, and packed.

BRIEF DESCRIPTION OF THE INVENTION

The present invention relates to an acidified protein product in the form of grains or a block pressed from the grains which can be eaten as such like cottage cheese and/or salad cheese, or used as a meat substitute like minced meat or meat after frying and grilling, for example. The present invention relates also to processes for the preparation of said acidified protein product. Outer appearance of the grains of the invention is similar to that of cottage cheese. The texture of the grains gives "mouth feel" and is slightly elastic. The grains of the invention differ from the conventional cottage cheese in that they do not melt and clump together when fried and/or do not scorch onto frying ware when fried whereas the grains of conventional cottage cheese melt into solid chewy mass in frying and heating.

In addition, the present invention relates to a process for manufacturing an acidified protein product. The process for manufacturing the acidified protein product of the present invention comprises the steps of:

a) providing a casein containing raw material,
b) subjecting the raw material to an acidification step, wherein a crosslinking enzyme, an acidifier and optionally calcium solution are added to the raw material to form a gel having pH in the range of 4.4-5.0,
c) cutting the formed gel into mass formed of grains and/or cubes and subjecting the mass to a scalding step, wherein the temperature of the mass is raised up to a range from about 45° C. to about 90° C. under stirring to form a scalded mass,
d) separating the water portion from the scalded mass to provide an acidified protein product in the form of grains,
e) optionally pressing the grains into a block,
f) optionally seasoning and/or packing the grains or the block.

In one embodiment, the process for manufacturing the acidified protein product of the present invention comprises the steps of:

a1) providing raw materials comprising a casein containing material having a protein content of 2.5%-5.0% (w/w), a crosslinking enzyme, an acidifier, and optionally a calcium solution,
b) subjecting the casein containing material to an acidification step, wherein a crosslinking enzyme, an acidifier and optionally calcium solution are added to the casein containing material to form a gel having pH in the range of 4.4-5.0,
c) cutting the formed gel into mass formed of grains and/or cubes and subjecting the mass to a scalding step, wherein the temperature of the mass is raised up to a range from about 45° C. to about 90° C. under stirring to form a scalded mass,
d) separating the water portion from the scalded mass to provide an acidified protein product in the form of grains,
e) optionally pressing the grains into a block, f) optionally seasoning and/or packing the grains or the block.

In one embodiment, the process for manufacturing the acidified protein product of the present invention comprises the steps of:

a1) providing raw materials comprising a casein containing material having a protein content of 2.5%-5.0% (w/w) and a carbohydrate content of 2.5%-6% (w/w), a crosslinking enzyme, an acidifier, and optionally a calcium solution, a2) subjecting the casein containing material to a heat-treatment, b1) adjusting the temperature of the heat-treated casein containing material to an acidification temperature, b2) adding a crosslinking enzyme, an acidifier and optionally calcium solution to the casein containing material, b3) allowing the mixture to gel and acidify until pH is in the range of 4.4-5.0, c) cutting the formed gel into mass formed of grains and/or cubes and subjecting the mass to a scalding step, wherein the temperature of the mass is raised up to a range from about 45° C. to about 90° C. under stirring to form a scalded mass, d) separating the water portion from the scalded mass to provide an acidified protein product in form of grains, e) optionally pressing the grains into a block, f) optionally seasoning and/or packing the grains or the block.

The objects of the invention are achieved by methods and compositions characterized by what is stated in the independent claims. The preferred embodiments of the invention are disclosed in the dependent claims.

DETAILED DESCRIPTION OF THE INVENTION

In the present invention, it was surprisingly found that an acidified protein product in the form of grains can be obtained using a conventional cheese manufacturing process or a cottage cheese manufacturing process, without a rennet, from raw materials comprising casein containing material, a crosslinking enzyme, an acidifier and optionally lactose and/or calcium The obtained grains can be used as such or pressed into a block, both being stable for heating on a frying-pan or by microwaves.

Thus, the invention is based on a finding, that the use of a rennet is not necessary in the manufacture of cottage cheese type of grains. Typically in a cottage cheese manufacturing process, chymosin, pepsin, or enzymes produced by microbes *Rhizomucor miehei* (Hannilase) or *Cryphonectria (Endothia) parasitica* (Suparen), for example, are used as a rennet. The grains obtained in the present invention do not melt and/or clump together when fried on a hot fry-pan or a grill or when heated with microwaves. The grains can also be frozen before frying and they stay fry-proof. The grains can be pressed into a block, which is stable when fried on a hot fry-pan or a grill or when heated with microwaves. The block can also be frozen before frying and it stays fry-proof.

Accordingly, the present invention relates to a process for manufacturing an acidified protein product. The process for manufacturing the acidified protein product of the present invention comprises the steps of:

a) providing a casein containing raw material, b) subjecting the raw material to an acidification step, wherein a crosslinking enzyme, an acidifier and optionally calcium solution are added to the raw material to form a gel having pH in the range of 4.4-5.0, c) cutting the formed gel into mass formed of grains and/or cubes and subjecting the mass to a scalding step, wherein the temperature of the mass is raised up to a range from about 45° C. to about 90° C. under stirring to form a scalded mass, d) separating the water portion from the scalded mass to provide an acidified protein product in the form of grains, e) optionally pressing the grains into a block, f) optionally seasoning and/or packing the grains or the block.

In one embodiment of the present invention the casein containing material is subjected to a heat-treatment before subjecting it to an acidification step. In the method of the invention, the heat-treatment is performed using methods known per se. Useful heat-treatment processes are, among others, pasteurisation, high-pasteurisation, thermisation, UHT treatment and ESL treatment. Examples of suitable heat-treatments include heating at 80-95° C. for 30 seconds to 5 minutes, UHT treatment at 155° C. for 1 to 2 seconds and ESL treatment at 125-145° C. for 0.5 seconds. In one embodiment, the heat-treatment is performed at a temperature of 80-155° C. in order to inactivate the inhibitors of the cross-linking enzymes present in the casein containing material. In one embodiment, the heat-treatment is performed at a temperature of 80-95° C. for 30 seconds to 5 minutes.

In one embodiment the process for manufacturing the acidified protein product of the present invention comprises the steps of:

a) providing a casein containing raw material, a2) subjecting the casein containing material to a heat-treatment before subjecting to an acidification step, b) subjecting the raw material to an acidification step, wherein a crosslinking enzyme, an acidifier and optionally calcium solution are added to the raw material to form a gel having pH in the range of 4.4-5.0, c) cutting the formed gel into mass formed of grains and/or cubes and subjecting the mass to a scalding step, wherein the temperature of the mass is raised up to a range from about 45° C. to about 90° C. under stirring to form a scalded mass, d) separating the water portion from the scalded mass to provide an acidified protein product in the form of grains, e) optionally pressing the grains into a block, f) optionally seasoning and/or packing the grains or the block.

Further, in one embodiment the process for manufacturing the acidified protein product of the present invention comprises the steps of:

a) providing a heat-treated casein containing raw material, b) subjecting the raw material to an acidification step, wherein a crosslinking enzyme, an acidifier and optionally calcium solution are added to the raw material to form a gel having pH in the range of 4.4-5.0, c) cutting the formed gel into mass formed of grains and/or cubes and subjecting the mass to a scalding step, wherein the temperature of the mass is raised up to a range from about 45° C. to about 90° C. under stirring to form a scalded mass, d) separating the water portion from the scalded mass to provide an acidified protein product in the form of grains, e) optionally pressing the grains into a block, f) optionally seasoning and/or packing the grains or the block.

In one embodiment, the process for manufacturing the acidified protein product of the present invention comprises the steps of:

a1) providing raw materials comprising a casein containing material having a protein content of 2.5%-5.0% (w/w), a crosslinking enzyme, an acidifier, and optionally a calcium solution, b) subjecting the casein containing material to an acidification step, wherein a crosslinking enzyme, an acidifier and optionally calcium solution are added to the casein containing material to form a gel having pH in the range of 4.4-5.0, c) cutting the formed gel into mass formed of grains and/or cubes and subjecting the mass to a scalding step, wherein the temperature of the mass is raised up to a range from about 45° C. to about 90° C. under stirring to form a scalded mass, d) separating the water portion from the scalded mass to provide an acidified protein product in the form of grains, e) optionally pressing the grains into a block, f) optionally seasoning and/or packing the grains or the block.

In one embodiment, the process for manufacturing the acidified protein product of the present invention comprises the steps of:

a1) providing raw materials comprising a casein containing material having a protein content of 2.5%-5.0% (w/w), a crosslinking enzyme, an acidifier, and optionally a calcium solution, a2) subjecting the casein containing material to a heat-treatment, b1) adjusting the temperature of the heat-treated casein containing material to an acidification temperature, b2) adding a crosslinking enzyme, an acidifier and optionally calcium solution to the casein containing material, b3) allowing the mixture to gel and acidify until pH is in the range of 4.4-5.0, c) cutting the formed gel into mass formed of grains and/or cubes and subjecting the mass to a scalding step, wherein the temperature of the mass is raised up to a range from about 45° C. to about 90° C. under stirring to form a scalded mass, d) separating the water portion from the scalded mass to provide an acidified protein product in form of grains, e) optionally pressing the grains into a block, f) optionally seasoning and/or packing the grains or the block.

The grains produced by the method of the present invention have a protein content of about 10% (w/w) to about 50% (w/w) and pH of about 4.4. to about 5.0.

In step a) of the process of the present invention a casein containing raw material is provided. In step a1) of the process of the present invention, raw materials comprising a casein containing material having a protein content of 2.5%-5.0% (w/w) is provided. In one embodiment, the casein containing material has a protein content of about 3.0%-4.0% (w/w). In one embodiment, the casein containing material has a carbohydrate content of 2.5%-6.0% (w/w). In one embodiment, the casein containing material has a carbohydrate content of 4.0%-5.0% (w/w). In one embodiment, in step a) of the process of the present invention, raw materials comprising a casein containing material having a protein content of 2.5%-5.0% (w/w) and a carbohydrate content of 2.5%-6.0% (w/w) are provided. In one embodiment, the casein containing material has a protein content of about 3.0%-4.0% (w/w) and and a carbohydrate content of about 4.0%-5.0% (w/w). In connection with the present invention, the casein containing material having a protein content of 2.5%-5.0% (w/w) can be derived from whole milk, cream, low-fat or skimmed milk, low-lactose or lactose-free milk, butter milk or milk reconstituted from milk powder, organic milk, a fraction containing casein(s) or a combination of these. The casein containing material may be supplemented by ingredients generally used in producing milk products, such as fat or sugar fractions.

In one embodiment, the casein containing material having a protein content of 2.5%-5.0% (w/w) is derived from a group consisting of skimmed milk, butter milk and a fraction containing casein(s). In one embodiment, the casein containing material having a protein content of 2.5%-5.0% (w/w) and a carbohydrate content of 2.5%-6.0% (w/w) is derived from a group consisting of skimmed milk, butter milk and a fraction containing casein(s).

The fraction containing casein(s) or the casein fraction can be obtained, for example, from a caseinate, derived and/or produced from micellar casein or from a milk raw material, such as skimmed milk, by different separation techniques, such as, chromatographic or membrane techniques or centrifugation etc. or combinations thereof. In one embodiment, the casein molecules in the casein fraction are in their native/intact form.

In one embodiment, the casein fraction can be obtained from a caseinate. Caseinates, such as sodium caseinate, calcium caseinate and potassium caseinate, are soluble salts of casein. Caseinates provide outstanding nutritional properties, contain all of the essential amino acids, have a protein efficiency ratio (P.E.R.) of 2.5, and have a minimum protein content of 90% (dry solids basis). In one embodiment, the casein fraction can be obtained from calcium caseinate.

In one embodiment, the casein fraction can be derived and/or produced from micellar casein, for example. Micellar casein is ultrafiltered casein extracted from milk without acidification.

In one embodiment, the casein fraction can be obtained from a milk raw material, such as skimmed milk, by different separation techniques, such as, chromatographic or membrane techniques or centrifugation etc. or combinations thereof. In one embodiment, the separation technique is chromatographic separation. In one embodiment, the separation technique is centrifugation. In one embodiment, the separation technique is one or more membrane techniques, such as microfiltration, ultrafiltration, nanofiltration, reverse osmosis or their combinations. The membrane filtrations, such as ultrafiltration and microfiltration, can be performed with diafiltration technique.

In one embodiment, the casein fraction is produced from milk raw material, such as, skimmed milk by membrane filtration using filtration techniques, such as microfiltration, ultrafiltration, nanofiltration, reverse osmosis or their combinations. The filtration techniques are carried out utilizing methods known to the person skilled in the art. In one embodiment, the casein fraction is produced from skimmed milk by microfiltration. The microfiltration of the milk raw material retains major portion of the casein in the retentate whereas major portion of the whey proteins passes into the permeate. The casein fraction thus produced can be further concentrated by ultrafiltration. In one embodiment, the casein concentrate is produced from skimmed milk by microfiltration and ultrafiltration. In one embodiment, the casein fraction is produced from skimmed milk by microfiltration and evaporation. The casein molecules maintain their native form in the filtration procedures.

In one embodiment, the casein fraction contains about 8.5%-about 20% (w/w) caseins, the total protein content being about 9.15%-about 22% (w/w). In one embodiment, total protein content of the casein fraction is about 9.15%-about 22% (w/w) of which about 8.5%-about 20% (w/w), respectively, are caseins. In one embodiment, the casein fraction contains about 8.5%-about 20% (w/w) caseins, the total protein content being about 9.15%-about 22% (w/w), and about 0.7%-about 2.1% (w/w) carbohydrates, of which about 0.4%-about 1.2% (w/w) is lactose. In one embodiment, the casein fraction contains about 8.5%-about 20% (w/w) caseins, the total protein content being about 9.15%-about 22% (w/w), about 0-about 0.02% (w/w) fat, about 0.7%-about 2.1% (w/w) carbohydrates, about 0.4%-about 1.2% (w/w) lactose, about 0.85%-about 2.3% (w/w) ash, about 2500-7500 mg/kg calcium and about 80-240 mg/kg sodium. In one embodiment, the casein fraction contains about 8.5% (w/w) caseins, the total protein content being about 9.15% (w/w). In one embodiment, the casein fraction contains about 20% (w/w) caseins, the total protein content being about 22% (w/w). In one embodiment, the casein fraction contains about 8.5% (w/w) caseins, the total protein content being about 9.15% (w/w) and about 0.7% (w/w) carbohydrates of which about 0.4% (w/w) is lactose. In one embodiment, the casein fraction contains about 8.5% (w/w) caseins, the total protein content being about 9.15% (w/w), about 0.08% (w/w) fat, about 0.7% (w/w) carbohydrates, about 0.4% (w/w) lactose, about 0.85%(w/w) ash, about 2500 mg/kg calcium and 80 mg/kg sodium.

In one embodiment, the casein containing material having a protein content of 2.5%-5.0% (w/w) is or is derived from skimmed milk. In one embodiment, the casein containing material having a protein content of 2.5%-5.0% (w/w) and a carbohydrate content of 2.5%-6% (w/w) is or is derived from skimmed milk.

In one embodiment, the casein containing material having a protein content of 2.5%-5.0% (w/w) is or is derived from butter milk. In one embodiment, the casein containing material having a protein content of 2.5%-5.0% (w/w) and a carbohydrate content of 2.5%-6% (w/w) is or is derived from butter milk.

In one embodiment, the casein containing material having a protein content of 2.5%-5.0% (w/w) is or is derived from a fraction containing casein. In one embodiment, the casein containing material having a protein content of 2.5%-5.0% (w/w) and a carbohydrate content of 2.5%-6% (w/w) is or is derived from a fraction containing casein.

In one embodiment, the casein molecules in the casein containing material are in their native/intact form.

In step a2) of the process of the present invention the casein containing material having a protein content of 2.5%-5.0% (w/w) is subjected to a heat-treatment. In the method of the invention, the heat-treatment is performed using methods known per se. Useful heat-treatment processes are, among others, pasteurisation, high-pasteurisation, thermisation, UHT treatment and ESL treatment. Examples of suitable heat-treatments include heating at 80-95° C. for 30 seconds to 5 minutes, UHT treatment at 155° C. for 1 to 2 seconds and ESL treatment at 125-145° C. for 0.5 seconds. In one embodiment, the heat-treatment is performed at a temperature of 80-155° C. in order to inactivate the inhibitors of the cross-linking enzymes present in the casein containing material.

In step b1) of the process of the present invention the temperature of the heat-treated casein containing material having a protein content of 2.5%-5.0% (w/w) is adjusted to an acidification temperature. In one embodiment, the temperature adjustment is performed by cooling the heat-treated casein containing material. In one embodiment, the temperature adjustment is performed by heating the casein containing material. The acidification temperature depends on the acidifier. If the acidifier is a thermophilic acidifier or starter, the mixture is cooled to a temperature of about 40 to 45° C. If the acidifier is a mesophilic acidifier or starter, the mixture is cooled to a temperature of about 30° C.

In step b2) of the process of the present invention, a crosslinking enzyme, an acidifier and optionally a calcium solution are added to the casein containing material.

The crosslinking enzyme suitable for use in the method of the invention may be any enzyme that is known to crosslink milk proteins. These enzymes include transglutaminase, laccase, tyrosinase, peroxidase, sulfhydryl oxidase, and glucose oxidase for example. Said enzymes can be used alone or in any combinations with each other. The enzyme is typically used in an amount of 0.2U enzyme/g protein to about 20U enzyme/g protein, preferably about 3U enzyme/g protein.

In an embodiment of the invention, the crosslinking enzyme is transglutaminase (EC 2.3.2.13). It is commonly known that transglutaminase catalyzes the generation of covalent linkages between the glutamine and lysine amino acid residues present in the protein molecules. Of milk proteins, caseins, in particular K-casein, are the best substrates for a transglutaminase. β-casein, too, is rich in glutamine and lysine that the enzyme links together. Transglutaminase can be any transglutaminase commonly used in dairy industry. It can be derived from a microbial source, fungus, mould, fish and a mammal. In an embodiment of the invention, transglutaminase is isolated from a microbial source. There are several commercially available transglutaminase enzyme preparations that are suitable for use in the process of the invention. These include Activa®YG (Ajinomoto, Japan), Activa®MP (Ajinomoto, Japan), and Yiming-TG (Yiming Fine Chemicals Co., Ltd., China). In one embodiment, the enzyme preparation is in a liquid form. In one embodiment, the liquid enzyme preparation is manufactured by Valio Oy, Finland. In one embodiment, the liquid transglutaminase enzyme preparation has crosslinking activity of about 100 U/g. In one embodiment, the transglutaminase preparation is used in an amount of 2.5-5.0 g/U protein. In one embodiment, the transglutaminase preparation is used in an amount of 5.0 g/U protein. Optimum conditions depend on the enzyme used and they can be obtained from the manufacturers of the commercial enzymes.

In another embodiment, the crosslinking enzyme is selected from laccase, tyrosinase, peroxidase, sulfhydryl oxidase, and/or glucose oxidase. Laccases (EC 1.10.3.2) derived from fungi and bacteria, such as, fungus *Trametes hirsute,* catalyze the crosslinking between carbohydrates and proteins (oxidation of aromatic compounds and cysteine) with applications in food processing for reduction of allergenicity, for example. Tyrosinases (EC 1.14.18.1) are enzymes which catalyzes the oxidation of phenols such as tyrosine, with applications in food processing for reduction of allergenicity, for example. Tyrosinases can be derived from a variety of plant, animal and fungal species, i.e. filamentous fungus *Trichoderma reesei.* Peroxidases (EC 1.11.1.7) are a family of enzymes that catalyze the oxidation of aromatic compounds with applications in food processing for reduction of allergenicity, for example. Sulfhydryl oxidase (EC 1.8.3.3) catalyzes the formation of disulfide bonds, oxidation of glutathione. Glucose oxidase catalyzes the formation of protein crosslinks and oxidate gelation of pentosans.

The acidifier suitable for use in the method of the invention may be selected from mesophilic starters, thermophilic starters or chemical acidifiers. In one embodiment, the acidifier is a mesophilic starter, such as *Lactococcus lactis* ssp. *cremoris, Lactococcus lactis* ssp. *lactis, Leuconostoc*

*mesenteroides* ssp. *cremoris* and/or *Lactococcus lactis* ssp. *diacetylactis*. In one embodiment, the acidifier is a thermophilic acidifier or starter, such as *Lactobacillus acidophilus, L. bulgaricus, L.delbrueckii* subs. *bulgaricus, Bifidobacterium lactis*. In one embodiment, the acidifier is a chemical acidifier such as glucono-delta-lactone, lactic acid, hydrochloric acid, citric acid, acetic acid or a combination of different acid.

The calcium containing solution suitable for use in the method of the invention may be any calcium containing solution acceptable for use in food products. In one embodiment, the solution is $CaCl_2$-solution.

Crosslinking enzyme treatment and acidification of the casein containing material or the mixture can be done simultaneously or sequentially in either order. In one embodiment, crosslinking enzyme treatment and acidification are done simultaneously. In another embodiment, crosslinking enzyme treatment is done first followed by acidification. In a further embodiment, acidification is done first followed by crosslinking enzyme treatment.

In step b3) of the process of the present invention, the mixture is allowed to gel and acidify until pH is in the range of 4.4-5.0. In one embodiment, the mixture is allowed to gel and acidify until pH is in the range of 4.6-4.9.

In step c) of the process of the present invention, the formed gel is cut into mass formed of grains and/or cubes and the mass is subjected to a scalding step, wherein the temperature of the mass is raised to a range from about 45° C. to about 90° C. under stirring to form a scalded mass.

In the scalding step, the temperature is raised to a range from about 45° C. to about 90° C., specifically about 55° C. to about 75° C. The temperature of mass can be raised directly, for example, by adding warm liquid or steam to the curd mixture, or indirectly through the cheese vat casing. Scalding is carried out for about 5 to about 180 minutes. In an embodiment, the mass is heated by a jacket, 0.2-1° C./min using variable rate. After the temperature of 75° C. is reached, the heating is stopped indicating that a total scalding time is approximately 70 to 110 minutes.

In step d) of the process of the present invention, the water portion is separated from the scalded mass to provide an acidified protein product in form of grains.

The grains produced by the method of the present invention have a protein content of about 10% (w/w) to about 50% (w/w) and pH of about 4.4. to about 5.0. In one embodiment, the protein content of the grains is in the range of about 10% to about 23%. In another embodiment, the protein content is about 20% to about 50%. In one embodiment, the pH is in the range of 4.6-4.9.

In step e) of the process of the present invention the grains are optionally pressed into a block. The grains are pressed into a block using methods and equipment known to a person skilled in the art.

In step f) of the process of the present invention, the grains or the block is optionally seasoned and/or packed. The grains or the block can be brined or salted with dry salt. The grains or the block can be seasoned. Salt can be NaCl, KCl, Na-carbonate, sodium hydrogen phosphate, AIV-mix or a milk-based mineral product (dry or liquid, concentrate, brine), or a mixture thereof. The milk-based mineral product refers to, for example, a salt described in publication EP 1061811 B1, i.e. a milk mineral powder known as trademark Valio Milk Mineral Powder VMMP (Valio Oy). Other feasible milk-based mineral products include trademarks such as Capolac® MM-0525 BG (Arla Foods Ingredients), Vitalarmor CA (Armor Proteins) and Sodidiet 40 MI (Sodiaal Industrie).

The casein containing material having a protein content of 2.5%-5.0% (w/w) and optionally a carbohydrate content of 2.5%-6.0% (w/w) as disclosed above can be derived from skimmed milk, butter milk or a casein fraction, for example. In one embodiment, the casein containing material having a protein content of 2.5%-5.0% (w/w) and optionally a carbohydrate content of 2.5%-6.0% (w/w) is derived from a casein fraction. In this embodiment, the casein fraction is mixed with a lactose fraction. In one embodiment, the casein fraction and lactose fraction are mixed together in a ratio varying from 50:50 to 55:45. In one embodiment, the casein fraction and lactose fraction are mixed together in a ratio of 53:47.

In one embodiment, the dry matter of the mixture in view of the protein content and the carbohydrate content is adjusted. In one embodiment, the mixture of the casein and lactose fractions is combined with water. In one embodiment, the mixture and water are combined together in a ratio varying from 60:40 to 65:35. In one embodiment, the mixture and water are combined together in a ratio of 63:37. In one embodiment, the mixture contains proteins from about 2.5% to about 5% (w/w) and carbohydrates from about 2.5 to about 6.0% (w/w). In one embodiment, the mixture contains proteins about 3% (w/w) and carbohydrates about 5% (w/w). In one embodiment, the mixture contains proteins about 3.5% (w/w) and carbohydrates about 5% (w/w). In one embodiment, the mixture contains proteins about 4.2% (w/w) and carbohydrates about 5% (w/w).

In one embodiment, the carbohydrate is lactose. In one embodiment the lactose is hydrolysed. In one embodiment the lactose is partly hydrolysed.

In connection with the present invention, the lactose fraction refers to a fraction containing lactose and obtainable from milk raw material, such as skimmed milk, by different separation techniques, such as, chromatographic or membrane techniques or combinations thereof. In one embodiment, the lactose fraction is produced from skimmed milk by microfiltration. The lactose fraction thus produced can be further concentrated by evaporation, for example. The lactose concentration of the fraction is in the range of 5% to 19%, the maximum concentration being in the range of 17-19%. In one embodiment, the lactose fraction is hydrolysed using lactase enzyme, for example. In one embodiment, the casein fraction and the lactose fraction are mixed together and the lactose is hydrolysed in the mixture.

There are several different commercially available lactase enzymes (β-D-galactosidases). These include for instance enzymes produced with the *Kluyveromyces fragilis* strain, such as HA lactase (Chr. Hansen NS, Denmark), or enzymes produced with the *Kluyveromyces lactis* strain, such as Validase (Valley Research Inc., USA), Maxilact L2000 lactase (DSM, Holland) and Godo YNL (Godo Shusei Company, Japan). Optimum hydrolysis conditions depend on the used enzyme and they can be obtained from the manufacturers of the commercial enzymes.

In one embodiment the casein containing material having a protein content of 2.5%-5.0% (w/w) and a carbohydrate content of 2.5%-6.0% (w/w) is produced by a process comprising the steps of:

g) providing raw materials comprising a casein fraction, a lactose fraction, and optionally a lactase h) mixing the casein containing material and the lactose fraction, i) adding a lactase and hydrolysing at least partly the lactose of the mixture, and j) adjusting the dry matter of the mixture in view of proteins and carbohydrates to provide a casein containing material having a protein content of 2.5%-5.0% (w/w) and a carbohydrate content of 2.5%-6.0% (w/w).

In one embodiment, the process for manufacturing the acidified protein product comprises the steps of:
providing raw materials comprising a casein fraction, a crosslinking enzyme, an acidifier, a lactose fraction, optionally a lactase and optionally a calcium solution,
mixing the casein containing material and the lactose fraction,
subjecting the mixture to a heat-treatment,
cooling the heat-treated mixture, adding a lactase and hydrolysing the lactose of the mixture,
adjusting the temperature of the mixture to an acidification temperature,
adding a crosslinking enzyme, an acidifier and optionally calcium solution to the mixture,
allowing the mixture to gel and acidify until pH is in the range of 4.4-5.0,
cutting the formed gel into mass formed of grains and/or cubes and subjecting the mass to a scalding step, wherein the temperature of the mass is raised up to a range from about 45° C. to about 90° C. under stirring to form a scalded mass,
separating the water portion from the scalded mass to provide an acidified protein product in form of grains,
optionally pressing the grains into a block,
optionally seasoning and/or packing the grains or the block.

In one embodiment, the casein containing material is skimmed milk. In one embodiment, the process for manufacturing the acidified protein product comprises the steps of:
providing raw materials comprising skimmed milk, a crosslinking enzyme, an acidifier and optionally a lactase and a calcium solution,
subjecting the skimmed milk to a heat-treatment,
adjusting the temperature of the heat-treated skimmed milk to an acidification temperature,
adding a crosslinking enzyme, an acidifier and optionally a lactase and/or calcium solution to the skimmed milk,
allowing the mixture to gel and acidify until pH is in the range of 4.4-5.0,
cutting the formed gel into mass formed of grains and/or cubes and subjecting the mass to a scalding step, wherein the temperature of the mass is raised up to a range from about 45° C. to about 90° C. under stirring to form a scalded mass,
separating the water portion from the scalded mass to provide an acidified protein product in form of grains,
optionally pressing the grains into a block,
optionally seasoning and/or packing the grains or the block.

In one embodiment, the casein containing material is butter milk. In one embodiment, the process for manufacturing the acidified protein product comprises the steps of:
providing raw materials comprising butter milk, a crosslinking enzyme, an acidifier and optionally a lactase and/or a calcium solution,
subjecting the butter milk to a heat-treatment,
adjusting the temperature of the heat-treated butter milk to an acidification temperature,
adding a crosslinking enzyme, an acidifier and optionally a lactase and/or calcium solution to the skimmed milk,
allowing the mixture to gel and acidify until pH is in the range of 4.4-5.0,
cutting the formed gel into mass formed of grains and/or cubes and subjecting the mass to a scalding step, wherein the temperature of the mass is raised up to a range from about 45° C. to about 90° C. under stirring to form a scalded mass,
separating the water portion from the scalded mass to provide an acidified protein product in form of grains,
optionally pressing the grains into a block,
optionally seasoning and/or packing the grains or the block In one embodiment, the process of the present invention does not comprise use of a rennet.

The present invention relates also to an acidified protein product, specifically to an acidified milk protein product, in the form of grains or in a form of a block or filet pressed or processed from the grains. The acidified milk protein product contains casein proteins. In one embodiment, the acidified protein product refers to a cheese. In one embodiment, the acidified protein product refers to a cheese-like product. In cheese-like products, milk fat and/or protein is replaced by other suitable fat and/or protein at least partly. Typically, milk fat is replaced by vegetable fat(s), such as, rapeseed oil, fractioned palm oil or coconut oil, for example. In one embodiment, the acidified protein product refers to a meat substitute or a meat analogue.

The protein content of the grains can vary in the range of about 10% to about 50%. In an embodiment, the protein content is about 10% to about 23%. In another embodiment, the protein content is about 20% to about 50%. In one embodiment, the proteins of the product are crosslinked.

The fat content of the grains can vary within a range of about 0% to about 30%.

The salt content of the grains ranges from about 0% to about 5%, specifically from 0.5% to 1%.

The lactose content of the grains can vary within the range of about 0% to about 2%.

The pH of the grains is in the range of about 4.4 to about 5.0. In an embodiment, the pH of grains is about 4.6 to about 4.9.

The acidified protein product of the invention can be in form of grains or as a compact uniform block or a fillet. The acidified protein product can be consumed as such or heated, fried, grilled or cooked. The product either in the form of grains or a compact uniform block or a fillet does not melt and/or clump together when fried on a hot fry-pan or a grill or when heated with microwaves. Thus, the acidified protein product of the present invention is fry-proof. The product can also be frozen before frying while staying fry-proof.

The following examples are presented for further illustration of the invention without limiting the invention thereto.

EXAMPLES

Example 1

Raw milk was separated and the obtained skimmed milk was pasteurized at 72° C. for 15 s and cooled. The cooled skimmed milk was microfiltered at a temperature of 50° C. to provide fractions of casein, whey and lactose, which were concentrated by ultrafiltration and nanofiltration. The obtained casein and lactose fractions were combined (53:47) and ESL-treated at 80° C. for 5 minutes and then cooled to a temperature of +4° C. A lactase enzyme (0.16%) was added to the cooled mixture, which was then allowed to hydrolyze for 24 hours at about +4-10° C. Water was added to the mixture in a ratio of 37:63 (water:casein-lactose mixture). The mixture contains about 3% protein and about 5% hydrolyzed lactose. The mixture was pumped into a cottage cheese vat and heated to a temperature of 40° C. Typically the temperature is in the range of 25-40° C. 0.1% by weight of CaCl$_2$-solution (34%) was added to the heated mixture. Typically 0.02-0.1% by weight of CaCl$_2$-solution (34%) is added to the heated mixture. At the same time a liquid transglutaminase enzyme preparation having cross-linking activity of about 100 U/g (Valio) was added in an amount of 5.0 g/U protein and stirred for about 10 minutes. Typically the enzyme is added in an amount of 0.2-5.0 g/U protein. A starter culture (*Lactococcus*) in an amount of 0.1% was added and stirring was continued for 20-30 minutes. Typically the starter culture (*Lactococcus*) is added in an amount of 0.03-0.1%. The mixture was allowed to acidify and gel for about 4 hours. When pH value of about 4.9 (4.9-4.4) was reached, the formed gel was cut into grains with a cutting tool. After cutting the grains were allowed to rest for about 15 minutes until wheying-off. Then stirring and heating the grains was started. The grains were heated up to 75° C. while stirring. The heating was continued until the dry matter was 10-30%. Grains were cooled to +4° C.-+10° C. The grains were packed with a flavor marinade in a ratio of 80:20 into boxes. The marinade contains vegetable oil. Cottage cheese types of grains do not melt and/or clump together when fried on a hot fry-pan or a grill or when heated with microwaves. The grains can also be frozen before frying and they stay fry-proof.

Example 2

Raw milk was separated and the obtained skimmed milk was pasteurized at 72° C. for 15 s and cooled. The cooled skimmed milk was microfiltered at a temperature of 50° C. to provide fractions of casein, whey and lactose, which were concentrated by ultrafiltration and nanofiltration. The obtained casein and lactose fractions were combined (53:47) and UHT-treated at 90° C. for 5 minutes and then cooled to a temperature of +4° C. A lactase enzyme (0.16%) was added to the cooled mixture, which was then allowed to hydrolyze for 24 hours at about +4° C. Water was added to the mixture in a ratio of 37:63 (water:casein-lactose mixture). The mixture contains about 3% protein and about 5% hydrolyzed lactose. The mixture was pumped into a cottage cheese vat and heated to a temperature of 25° C. Typically the temperature is in the range of 25-40° C. 0.02% by weight of CaCl$_2$-solution (34%) was added to the heated mixture. Typically 0.02-0.1% by weight of CaCl$_2$-solution (34%) is added to the heated mixture. At the same time a liquid transglutaminase enzyme preparation having crosslinking activity of about 100 U/g (Valio) was added in an amount of 0.2 g/U protein and stirred for about 10 minutes. Typically the enzyme is added in an amount of 0.2-5.0 g/U protein. A starter culture (*Lactobacillus thermophilus* and *Lactobacillus bulgaricus*) in an amount of 0.1% was added and stirring was continued for 20-30 minutes. Typically the starter culture (*Lactobacillus thermophilus* and *Lactobacillus bulgaricus*) is added in an amount of 0.03-0.1%. The mixture was allowed to acidify and gel for about 4 hours. When pH value of about 4.4 (4.9-4.4) was reached, the formed gel was cut into grains with a cutting tool. After cutting the grains were allowed to rest for about 15 minutes until wheying-off. Then stirring and heating the grains was started. The grains were heated up to 75° C. while stirring. The heating was continued until the dry matter is 10-30%. Grains were cooled to +4° C.-+10° C. The grains were packed with a flavor marmalade or marinade in a ratio of 80:20 into boxes. The marinade contains vegetable oil. The grains having yogurt taste can be fried on a fry-pan or with microwaves and they do not melt and/or clump together. The grains can also be frozen before frying and they stay fry-proof.

Example 3

Raw milk was separated and the obtained skimmed milk was pasteurized at 72° C. for 15 s and cooled. The cooled skimmed milk was microfiltered at a temperature of 50° C. to provide fractions of casein, whey and lactose, which were concentrated by ultrafiltration and nanofiltration. The obtained casein and lactose fractions were combined (53:47) and ESL-treated at 80° C. for 5 minutes or UHT-treated at 90° C. for 5 minutes and then cooled to a temperature of +4° C. A lactase enzyme (0.16%) was added to the cooled mixture, which was then allowed to hydrolyze for 24 hours at about +4° C. Water was added to the mixture in a ratio of 37:63 (water:casein-lactose mixture). The mixture contains about 3% protein and about 5% hydrolyzed lactose. The mixture was pumped into a cheese vat and heated to a temperature of 40° C. Typically the temperature is in the range of 25-40° C. 0.02% by weight of CaCl$_2$-solution (34%) was added to the heated mixture. Typically 0.02-0.1% by weight of CaCl$_2$-solution (34%) is added to the heated mixture. At the same time a liquid transglutaminase enzyme preparation having crosslinking activity of about 100 U/g (Valio) was added in an amount of 5.0 g/U protein and stirred for about 10 minutes. Typically the enzyme is added in an amount of 0.2-5.0 g/U protein. A starter culture (*Lactococcus*) in an amount of 0.03-0.1% was added and stirring was continued for 20-30 minutes. Typically a starter culture or a slurry can be added ion an amount of 0.03-0.1%. The mixture was allowed to acidify and gel for about 4 hours. When pH value of about 4.9-4.4 was reached, the formed gel was cut into grains with a cutting tool. After cutting the grains were allowed to rest for about 15 minutes until wheying-off. Then stirring and heating the grains was started. The grains were heated up to 55° C. while stirring. The heated grains were pumped into a buffer silo. From the buffer silo the grains were pumped in to a Casomatic, wherein the water was separated. After this the grains were packed into a mold, wherein water is separated from the grains with the aid of pressure and at the same time the grains attach to each other forming a block. The block was detached from the mold and put into concentrated salt water for a couple hours. The salted block was cut or torn into cubes or slices among which a flavor marinade was added. The protein content of the end product depends on the pressing time and pressure. The product does not melt when fried on a hot fry-pan or a grill or when heated with microwaves. It can also be frozen before frying while staying fry-proof.

Example 4

Raw milk was separated and the obtained skimmed milk was pasteurized at 72° C. for 15 s and cooled. The cooled skimmed milk was microfiltered at a temperature of 50° C. to provide fractions of casein, whey and lactose, which were concentrated by ultrafiltration and nanofiltration. The obtained casein and lactose fractions were combined (53:47) and ESL-treated at 80° C. for 5 minutes or UHT-treated at 90° C. for 5 minutes and then cooled to a temperature of +4° C. A lactase enzyme (0.16%) was added to the cooled mixture, which was then allowed to hydrolyze for 24 hours at about +4° C. Water was added to the mixture in a ratio of 37:63 (water:casein-lactose mixture). The mixture contains about 3% protein and about 5% hydrolyzed lactose. The mixture was pumped into a cheese vat and heated to a temperature of 25-40° C.

0.02-0.1% by weight of CaCl2-solution (34%) was added to the heated mixture. At the same time a liquid transglutaminase enzyme preparation having crosslinking activity of about 100 U/g (Valio) was added in an amount of 0.2-5.0 g/U protein and stirred for about 10 minutes. A chemical acidifier, such as GDL, lactic acid or $CO_2$, was added and allowed to acidify quickly to pH value of 5.4 (no gel formation). When the pH is 5.4, a starter culture (*Lactococcus*) or a slurry in an amount of 0.03-0.1% was added and stirring was continued for 20-30 minutes. The mixture was allowed to acidify and gel for about 2 hours. When pH value of about 4.9-4.4 was reached, the formed gel was cut into grains with a cutting tool. After cutting the grains were allowed to rest for about 15 minutes until wheying-off. Then stirring and heating the grains was started. The grains were heated up to 55° C. while stirring. The heated grains were pumped into a buffer silo. From the buffer silo the grains were pumped in to a Casomatic wherein the water was separated. After this the grains were packed into a mold, wherein water is separated from the grains with the aid of pressure and at the same time the grains attach to each other forming a block. The block was detached from the mold and put into concentrated salt water for a couple hours. The salted block was cut or torn into cubes or slices among which a flavor marinade was added. The protein content of the end product depends on the pressing time and pressure. The product does not melt when fried on a hot fry-pan or a grill or when heated with microwaves. It can also be frozen before frying while staying fry-proof.

Example 5

Raw milk was separated and the obtained skimmed milk was pasteurized at 72° C. for 15 s and cooled. The cooled skimmed milk was microfiltered at a temperature of 50° C. to provide fractions of casein, whey and lactose, which were concentrated by ultrafiltration and nanofiltration. The obtained casein and lactose fractions were combined (53:47) and ESL-treated at 80° C. for 5 minutes or UHT-treated at 90° C. for 5 minutes and then cooled to a temperature of +4° C. A lactase enzyme (0.16%) was added to the cooled mixture, which was then allowed to hydrolyze for 24 hours at about +4° C. Water was added to the mixture in a ratio of 37:63 (water:casein-lactose mixture). The mixture contains about 3% protein and about 5% hydrolyzed lactose. The mixture was pumped into a cheese vat and heated to a temperature of 25-40° C. 0.02-0.1% by weight of $CaCl_2$-solution (34%) was added to the heated mixture. At the same time a liquid transglutaminase enzyme preparation having crosslinking activity of about 100 U/g (Valio) was added in an amount of 0.2-5.0 g/U protein and stirred for about 10 minutes. A starter culture (*Lactobacillus thermophilus* and *Lactobacillus bulgaricus*) in an amount of 0.03-0.1% was added and stirring was continued for 20-30 minutes. The mixture was allowed to acidify and gel for about 4 hours. When pH value of about 4.9-4.4 was reached, the formed gel was cut into grains with a cutting tool. After cutting the grains were allowed to rest for about 15 minutes until wheying-off. Then stirring and heating the grains was started. The grains were heated up to 55° C. while stirring. The heated grains were pumped into a buffer silo. From the silo the grains were pumped in to a Casomatic wherein the water was separated. After this the grains were packed into a mold, wherein water is separated from the grains with the aid of pressure and at the same time the grains attach to each other forming a block. The block was detached from the mold and put into concentrated salt water for a couple hours. The salted block was cut or torn into cubes or slices among which a flavor marinade was added. The protein content of the end product depends on the pressing time and pressure. The product does not melt when fried on a hot fry-pan or a grill or when heated with microwaves. It can also be frozen before frying while staying fry-proof.

Example 6

Raw milk was separated and the obtained skimmed milk was pasteurized at 72° C. for 15 seconds and cooled. The cooled skimmed milk was microfiltered at a temperature of 50° C. to provide fractions of casein, whey and lactose, which were concentrated by ultrafiltration and nanofiltration. The obtained casein and lactose fractions were combined (53:47) and ESL-treated at 80° C. for 5 minutes or UHT-treated at 90° C. for 5 minutes and then cooled to a temperature of +4° C. A lactase enzyme (0.16%) was added to the cooled mixture, which was then allowed to hydrolyze for 24 hours at about +4° C. Water was added to the mixture in a ratio of 37:63 (water:casein-lactose mixture). The mixture contains about 3% protein and about 5% hydrolyzed lactose. The mixture was pumped into a cheese vat and heated to a temperature of 25-40° C. 0.02-0.1% by weight of $CaCl_2$-solution (34%) was added to the heated mixture. At the same time a liquid transglutaminase enzyme preparation having crosslinking activity of about 100 U/g (Valio) was added in an amount of 0.2-5.0 g/U protein and stirred for about 10 minutes. A chemical acidifier, such as GDL, lactic acid or $CO_2$, was added and allowed to acidify quickly to pH value of 5.4 (no gel formation). When the pH is 5.4, a starter culture (*Lactobacillus thermophilus* and *Lactobacillus bulgaricus*) in an amount of 0.03-0.1% was added and stirring was continued for 20-30 minutes. The mixture was allowed to acidify and gel for about 2 hours. When pH value of about 4.9-4.4 was reached, the formed gel was cut into grains with a cutting tool. After cutting the grains were allowed to rest for about 15 minutes until wheying-off. Then stirring and heating the grains was started. The grains were heated up to 55° C. while stirring. The heated grains were pumped into a buffer silo. From the silo the grains were pumped in to a Casomatic wherein the water was separated. After this the grains were packed into a mold, wherein water is separated from the grains with the aid of pressure and at the same time the grains attach to each other forming a block. The block was detached from the mold and put into concentrated salt water for a couple hours. The salted block was cut or torn into cubes or slices among which a flavor marinade was added. The protein content of the end product depends on the pressing time and pressure. The product does not melt when fried on a hot fry-pan or a grill or when heated with microwaves. It can also be frozen before frying while staying fry-proof.

Example 7

Raw milk was separated and the obtained skimmed milk was pasteurized at 80° C. for 30 seconds or at 90° C. for 30 seconds, and then cooled to a temperature of +25° C.-+40° C. A lactase enzyme, a liquid transglutaminase enzyme, $CaCl_2$-solution and a starter culture were added as described in Examples 1 to 6. The mixture was allowed to acidify and when pH value of about 4.9-4.4 was reached, the formed gel was cut into grains with a cutting tool. After cutting the grains were allowed to rest for about 15 minutes until wheying-off. Then stirring and heating the grains was started. The grains were heated up to a temperature of 55° C.-80° C. while stirring. The separated liquid was removed. The grains were either packed as such or pressed into a block. The product either in the form of grains or a block does not melt when fried on a hot fry-pan or a grill or when heated with microwaves. It can also be frozen before frying while staying fry-proof.

Example 8

Butter milk was ESL-treated at 80° C. for 30 seconds or at 90° C. for 30 seconds and then cooled to a temperature of +25° C.-+40° C. A lactase enzyme, a liquid transglutaminase enzyme, and a starter culture were added as described in Examples 1 to 6. The mixture was allowed to acidify and when pH value of about 4.9-4.4 was reached, the formed gel was cut into grains with a cutting tool. After cutting the grains were allowed to rest for about 15 minutes until wheying-off. Then stirring and heating the grains was started. The grains were heated up to a temperature of 55° C.-80° C. while stirring. The separated liquid was removed. The grains were either packed as such or pressed into a block. The product either in the form of grains or a block does not melt when fried on a hot fry-pan or a grill or when heated with microwaves. It can also be frozen before frying while staying fry-proof.

It will be obvious to a person skilled in the art that, as the technology advances, the inventive concept can be implemented in various ways. The invention and its embodiments are not limited to the examples described above but may vary within the scope of the claims.

The invention claimed is:

1. A process for manufacturing an acidified protein product comprising the steps of:
    a) providing a casein containing raw material,
    b) subjecting the raw material to an acidification step including contacting the raw material with a crosslinking enzyme not including rennet, followed by contact with an acidifier to form a gel having a pH in the range of 4.4-5.0,
    c) cutting the formed gel into mass formed of grains and/or cubes and subjecting the mass to a scalding step, wherein the temperature of the mass is raised up to a range from about 45° C. to about 90° C. under stirring to form a scalded mass,
    d) separating a water portion from the scalded mass to provide an acidified protein product in the form of grains,
    e) optionally pressing the grains into a block, and
    f) optionally seasoning and/or packing the grains or the block.

2. The process according to claim 1, wherein the casein containing raw material has a protein content of 2.5%-5.0% (w/w).

3. The process according to claim 1, wherein the casein containing material is subjected to heat-treatment before subjecting to the acidification step.

4. The process according to claim 3, wherein the heat-treatment is performed at a temperature of 80-95° C. for 30 seconds to 5 minutes.

5. The process according to claim 1, wherein the casein containing raw material has a protein content of 2.5%-5.0% (w/w) and the casein containing raw material is subjected to a heat-treatment, and
    wherein the acidification step includes adjusting the temperature of the heat-treated casein containing material to an acidification temperature.

6. The process according to claim 1, wherein the casein containing material has a carbohydrate content of 2.5%-6.0% (w/w).

7. The process according to claim 1, wherein the process comprises additional steps of
    g) providing raw materials comprising a casein fraction, a lactose fraction, and a lactase,
    h) mixing the casein containing material and the lactose fraction,
    i) adding a lactase and hydrolysing at least partly the lactose of the mixture, and
    j) adjusting the dry matter of the mixture in view of proteins and carbohydrates to providea casein containing material having a protein content of 2.5%-5.0% (w/w) and a carbohydrate content of 2.5%-6.0% (w/w).

8. The process according to claim 1, wherein the casein containing material comprises native casein.

9. The process according to claim 1, wherein the acidification step further comprises contacting the raw material with a calcium solution.

* * * * *